F. MESINGER.
DRIVE BELT.
APPLICATION FILED SEPT. 3, 1919.

1,424,767. Patented Aug. 8, 1922.

Inventor
Frederick Mesinger,
By Attorney C. P. Goebel.

UNITED STATES PATENT OFFICE.

FREDERICK MESINGER, OF NEW YORK, N. Y.

DRIVE BELT.

1,424,767.  Specification of Letters Patent.  Patented Aug. 8, 1922.

Application filed September 3, 1919. Serial No. 321,321.

*To all whom it may concern:*

Be it known that I, FREDERICK MESINGER, a citizen of the United States of America, residing at New York, county, city, and State of New York, have invented certain new and useful Improvements in Drive Belts, of which the following is a specification.

This invention relates to drive belts and more particularly to friction drive belts, the invention having for its primary object to provide a belt of this character having maximum flexibility with an effective grip upon the flanges of the pulley, and which is so constructed as to practically eliminate stretching of the friction link members and which will run smoothly and noiselessly and will result in high efficiency in the transmission of power.

More particularly, the invention consists in a drive chain having outer link members of friction material arranged in pairs and the adjacent pairs of friction link members being pivotally connected by interposed inner link members together with means associated with each of the outer link members to prevent stretching thereof by strain or pull at the pivotal connections.

The invention also contemplates the provision of a connecting means between the outer friction link members and extending transversely thereof and independently of the pivotal connections between the outer and inner link members.

It is also an object of my invention to provide a continuous endless drive chain, as above referred to, in which any one of the links may be easily and quickly removed and additional links inserted to lengthen the chain or to replace worn links by new ones.

With the above and other objects in view, the invention consists in the improved drive chain as above characterized, in the form, construction and relative arrangement of the several elements, as will be hereinafter more fully described, illustrated in the accompanying drawing, and subsequently incorporated in the subjoined claims.

In the drawing wherein I have illustrated one practical embodiment of the invention, and in which similar reference characters designate corresponding parts throughout the several views.

Figure 4:
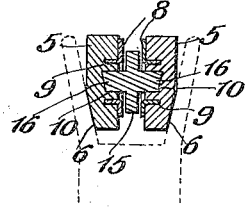
Fig. 4 is a section taken on the line 4—4 of Fig. 3.
Figure 6:
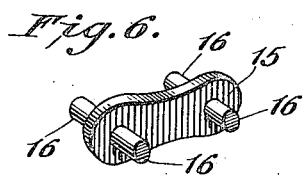
Fig. 6 is a detail perspective view of one of the inner link members.
Figure 5:
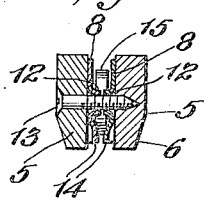
Fig. 5 is a section taken on the line 5—5 in Fig. 3 with the screw 13 shown centrally disposed.
Figure 7:
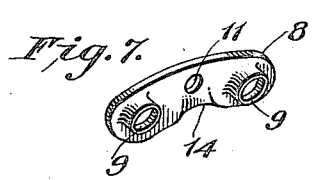
Fig. 7 is a similar view, of one of the reinforcing plates carried by the outer link members.

Referring in detail to the drawing, 5 designates the outer link members of the chain which are composed of leather or other high friction material. These outer link members are arranged in pairs and preferably have the lower portions of their outer faces inwardly beveled or inclined as indicated at 6, for gripping engagement with the inner faces of the flanges of a drive pulley as shown in dotted lines in Fig. 4 of the drawing, and in a similar manner to the construction shown and described in Patent No. 1,236,964, granted to me on August 14, 1917.

Figure 1:
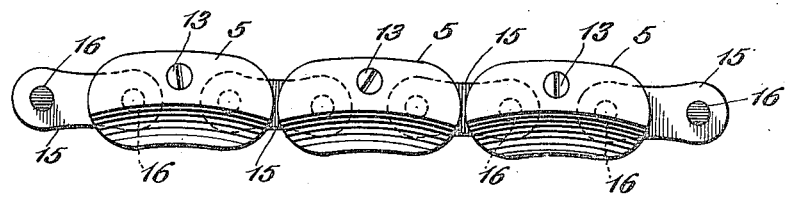
Fig. 1 is a side elevation of a section of a drive chain, embodying the present improvements.
Figure 2:
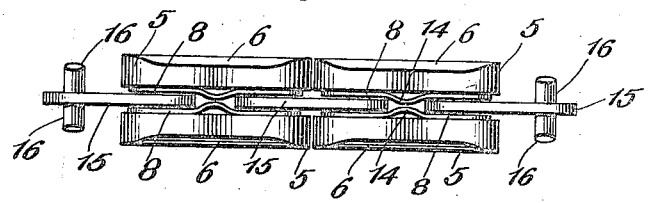
Fig. 2 is an edge view thereof with the connecting screws omitted.

Upon the inner face of each of the link members 5, a reinforcing plate of sheet steel indicated at 8 is arranged. This plate at its opposite ends has the tubular bosses 9 struck therefrom, and these bosses are imbedded in the leather or other friction material and disposed in concentric relation to the pivot receiving recesses 10 which are formed in the opposite ends of the link member 5. Each of the plates 8 adjacent to its outer edge has an opening 11 formed therethrough by means of a suitable punch whereby a boss 12 extending in an opposite direction with respect to the tubular bosses 9 is produced. These openings are adapted to receive a connecting screw 13 which extends through one of the link members 5 and has threaded engagement in the other of said link members whereby said members are securely connected and held against relative movement. The plate 8 is also slightly bent at its other longitudinal edge and between the tubular projections 9 as indicated at 14, such bent or curved portions of the plates being spaced from the side faces of the link members 5 and disposed in contiguous relation to each other when the link members are assembled, as shown in Fig. 2.

Figure 3:
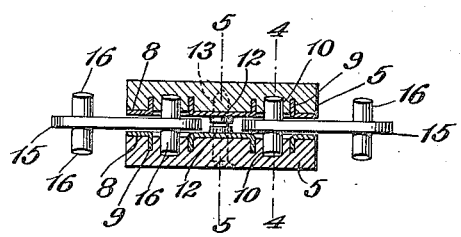
Fig. 3 is a longitudinal central section taken substantially horizontally through an outer link and two connected inner links.

The inner link members 15 are in the form of steel plates extending between and connecting the adjacent pairs of friction link members 5 to each other. Each of the steel link members is provided at its opposite ends with pivot studs 16 projecting from the opposite side faces thereof. These pivot studs are adapted for engagement in the sockets or recesses 10, and their end faces are beveled, as shown in Fig. 3, so as to give a uniform bearing upon the leather of the outer link members and permit of the free pivotal or turning movement of the inner and outer link members relative to each other. These pivot studs engaging directly upon the leather, serve to a large extent to eliminate noise in the flexing or relative pivotal movement of the chain links. At the same time it is to be noted that the portions of the leather which are engaged by the pivot studs are surrounded by the tubular projections 9 on the reinforcing plates 8. Thus stretching of the outer link members 5 is prevented and the chain may thus be subjected to severe longitudinal strains without danger of frictional binding contact between the ends of the outer link members 5 in adjacent pairs. It will therefore be appreciated that my improved construction provides for absolute flexibility in the operation of the chain. As the connecting screws 13 between the outer link members are located intermediate of the pivotal connections at the ends of said members, the strain or pull is not transmitted to these screws so that they are not liable to work loose. Further, the bent or curved portions 14 of the reinforcing plates being disposed between the opposed ends of the adjacent connecting link members 15, longitudinal shifting movement of the outer link members relative to said inner link members will be prevented when the leather or other frictional material engaged by the pivot studs 16 becomes excessively worn. Thus the pairs of outer link members will be maintained in proper relation to each other even after a long period of continuous use of the chain, so that there will be no frictional binding contact between these link members.

From the foregoing description considered in connection with the accompanying drawing, the construction and several advantages of my improved drive chain, will be fully understood. The chain is primarily designed for use in the driving of motorcycles, automobile radiator fans, generators, and similar devices where a non-slipping, noiseless drive chain of high transmission efficiency is particularly desirable. However, it is also to be understood that a chain constructed in accordance with the present invention may also be advantageously applied to numerous other uses. An endless link belt or chain of any desired length and without connectors of special construction, may be readily produced by means of my improvement and with the aid of an ordinary screw driver the length of the belt may be easily and quickly increased or decreased. It will be also appreciated that the improved construction is comparatively simple, and as the several parts are very durable, the chain or belt will give efficient service, without necessitating frequent repair, for a maximum length of time. The chain links may be manufactured in various sizes in accordance with the particular use to which the chain or belt is to be applied, the diameter of the drive pulley and the horsepower which is used.

I have herein disclosed one practical construction of my improved link belt or chain, which I have found to be very satisfactory in practical use. However, it is nevertheless to be borne in mind that the device is also susceptible of numerous other alternative constructions, and I accordingly reserve the privilege of adopting all such legitimate changes as may be fairly embodied within the spirit and scope of the invention as claimed:

I claim:

1. A drive belt comprising inner rigid links carrying pivot pins, outer flexible links received about the pivot ends, and reenforcing means for the outer flexible links having parts extending in spaced relation about the pivot pins, there being an intermediate layer of the flexible material of the outer links lying between the pivot pins and said parts.

2. A drive belt comprising link members of friction material, metallic link members pivotally connecting said friction link members and having pivot studs directly engaged with the friction link members, and metallic reinforcing means imbedded in the friction link members in spaced concentric relation to the pivot studs to prevent stretching of the latter link members when subjected to the pull or strain of the pivot studs.

3. A drive belt comprising inner metal links having pivot pins, outer leather links having recesses to receive the pins, the pins adapted to be supported and have a pivotal movement in the leather, a re-enforcing plate placed against the inner faces of the leather links and having bosses extending outwardly therefrom and entering the leather, said bosses being hollow and extending about the pivot pins and in spaced relation thereto, there being between the pivot pins and bosses rings of the leather of the outer links, such leather rings being confined and backed by said bosses.

4. A drive belt comprising metallic links, pairs of links of flexible material pivoted to said metallic links, re-enforcing plates for said flexible links having recesses extending about the pivots between the links and also having bosses extending about the openings and projecting into the flexible links, the pivot pins adapted to project through the opening and bosses, and means for securing said flexible links and re-enforcing plates together.

5. A belt of the kind described comprising pairs of outer link members, inner link members pivotally connected to said outer members, and reinforcing plates secured to the inner faces of said outer link members and having a loose fit about the pivot points between the links, said plates being bent toward one another at their intermediate portions for limiting the movement of the inner link members.

6. A drive belt comprising outer link members of frictional material arranged in pairs, interposed inner link members having pivot studs at their ends, the inner faces of the outer members being recessed to receive said studs, and a reinforcing plate on the inner face of each outer link member provided with tubular portions imbedded in said link member in spaced concentric relation to the pivot studs.

7. A drive belt comprising outer link members of frictional material arranged in pairs, interposed inner link members having pivot studs at their ends, the inner faces of the outer members being recessed to receive said studs, and a reinforcing plate on the inner face of each outer link member provided with tubular portions imbedded in said link member in spaced concentric relation to the pivot studs, each of said plates being further provided with a transversely curved portion between said tubular portions, said curved portions projecting towards each other between the opposed ends of the adjacent inner link members.

8. A drive belt comprising outer link members of frictional material arranged in pairs, interposed inner link members having pivot studs at their ends, the inner faces of the outer members being recessed to receive said studs, and a reinforcing plate on the inner face of each outer link member provided with tubular portions imbedded in said link member in spaced concentric relation to the pivot studs, and a connecting screw connecting the outer link members to each other independently of the inner link members.

9. A drive belt comprising outer link members of frictional material arranged in pairs, interposed inner link members having pivot studs at their ends, the inner faces of the outer members being recessed to receive said studs, and a reinforcing plate on the inner face of each outer link member provided with tubular portions imbedded in said link member in spaced concentric relation to the pivot studs, each of said plates being further provided with a transversely curved portion between said tubular portions, said curved portions projecting towards each other between the opposed ends of the adjacent inner link members, each of said plates having a screw receiving opening therein and a connecting screw extending through said openings, and connecting the outer link members to each other independently of the inner link members.

In testimony that I claim the foregoing as my invention, I have signed my name hereunder.

FREDERICK MESINGER.